United States Patent

[11] 3,628,754

[72] Inventor Sukeyosi Fujikawa
Tokyo, Japan
[21] Appl. No. 27,044
[22] Filed Apr. 9, 1970
[45] Patented Dec. 21, 1971
[73] Assignee Teac Corporation
Tokyo, Japan
[32] Priority Apr. 14, 1969
[33] Japan
[31] 44/28486

[54] TAPE MAGAZINE-LOADING DEVICE
4 Claims, 7 Drawing Figs.

[52] U.S. Cl. .................................................... 242/198, 274/4 F
[51] Int. Cl. .................................................... G03b 1/04, G11b 15/32, G11b 23/04
[50] Field of Search ........................................ 242/197–200; 274/4 F, 11 RC

[56] References Cited

UNITED STATES PATENTS

| | | | |
|---|---|---|---|
| 2,969,929 | 1/1961 | Rudzitis ........................ | 242/199 |
| 3,043,531 | 7/1962 | Sinkewitsch .................. | 242/198 X |
| 3,417,938 | 12/1968 | Markakis et al. ............. | 242/200 |

*Primary Examiner*—Leonard D. Christian
*Attorney*—Marshall & Yeasting

ABSTRACT: A tape magazine-loading device, wherein a holder is rotatably attached to the free ends of left and right rotary arms, and it is normally maintained horizontal at a position spaced apart from the tape magazine-loading portion. Insertion of the tape magazine into the holder from the front will cause the left and right rotary arms to be rotated so that the tape magazine is automatically moved toward the loading portion to be loaded therein while being held in the holder. By operating the return lever with the tape magazine being loaded in the loading portion, the holder will be depressed so as to be automatically returned to the horizontal position, and the tape magazine will automatically be pushed out of the holder.

TAPE MAGAZINE-LOADING DEVICE

BACKGROUND OF THE INVENTION

1. Field of the Invention

This invention relates to a tape magazine-loading device for magnetic recording and reproducing apparatus.

2. Description of the Prior Art

There have heretofore been proposed a variety of tape magazine-loading devices of this type; however, with such conventional devices, relatively troublesome manipulation is required in an attempt to load a tape magazine in the loading portion thereof. Another disadvantage is that the mechanism for permitting the tape magazine to be positively loaded in position is complicated.

SUMMARY OF THE INVENTION

According to one aspect of the present invention, a tape magazine can be automatically loaded in the loading portion merely by being pushed into the holder in one direction from the front to the back, and the tape magazine thus loaded can be ejected by one-stroke action of the return lever. This greatly facilitates the loading and ejection of the tape magazine.

According to another aspect of the present invention, the holder is rotatably attached to the free ends of left and right rotary arms, and it is normally maintained horizontal at a position spaced apart from the tape magazine-loading portion. Insertion of the tape magazine into the holder maintained at the horizontal position from the front will cause the left and right rotary arms to be rotated so that the tape magazine is automatically moved toward the loading portion to be loaded therein while being held in the holder. Because of the left and right rotary arms being rotatably attached to the holder, smooth loading of the tape magazine in the loading portion can be achieved. By operating the return lever with the tape magazine being loaded in the loading portion, the holder will be depressed so as to be automatically returned to the original horizontal position, and the tape magazine will be automatically pushed out of the holder. At this point, removal of the tape magazine thus pushed out can be easily attained. Advantageously, the mechanism for loading and ejecting the tape magazine relative to the loading portion is greatly simplified.

Other objects, features, and advantages of the present invention will become apparent from the following description taken in conjunction with the accompanying drawings.

DESCRIPTION OF THE PREFERRED EMBODIMENTS

Figure 1:
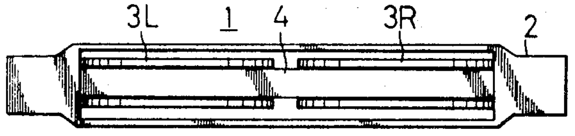
FIG. 1 is a schematic front view, partly cut away, showing a tape magazine which is loaded in the tape magazine-loading device according to the present invention.
Figure 2:
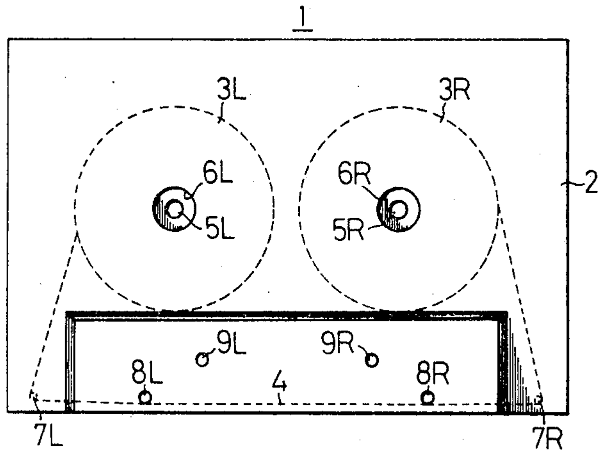
FIG. 2 is a top plan view thereof.

Referring first to FIGS. 1 and 2, a tape magazine which is adapted to be loaded in the device of this invention is shown generally at 1 wherein left- and right-hand side reels 3L and 3R are accommodated within a casing 2 with a magnetic tape 4 extending therebetween. The reels 3L and 3R are formed with reel shaft apertures 5L and 5R through which reel shafts are inserted respectively. Formed in the top and bottom walls of the casing 2 are reel shaft inserting apertures 6L and 6R through which the shaft apertures 5L and 5R are exposed to the top and bottom surfaces of the casing 2 respectively. The front wall of the casing 2 is opened at least in the center portion thereof so that the magazine tape 4 is guided while being exposed at the open wall. Numerals 7L and 7R indicate tape guides provided for this purpose within the casing 2 at front left- and right-hand side positions. Capstan-inserting apertures 8L and 8R are formed in the top and bottom walls of the casing 2 at positions along the back surface of the magnetic tape 4 extending between the tape guides 7L and 7R. Furthermore, positioning through-apertures 9L and 9R are formed in the top and bottom walls of the casing 2 adjacent to the capstan-inserting apertures 8L and 8R respectively.

Figure 3:
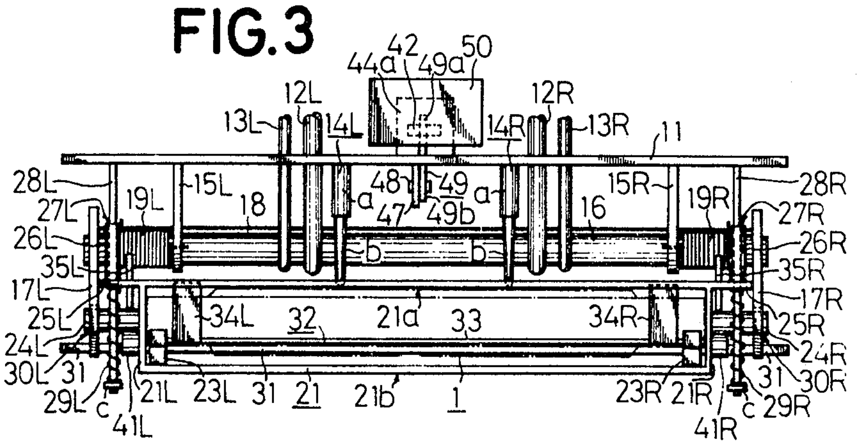
FIG. 3 is a schematic front view of the tape magazine-loading device according to an embodiment of the present invention.
Figure 4:
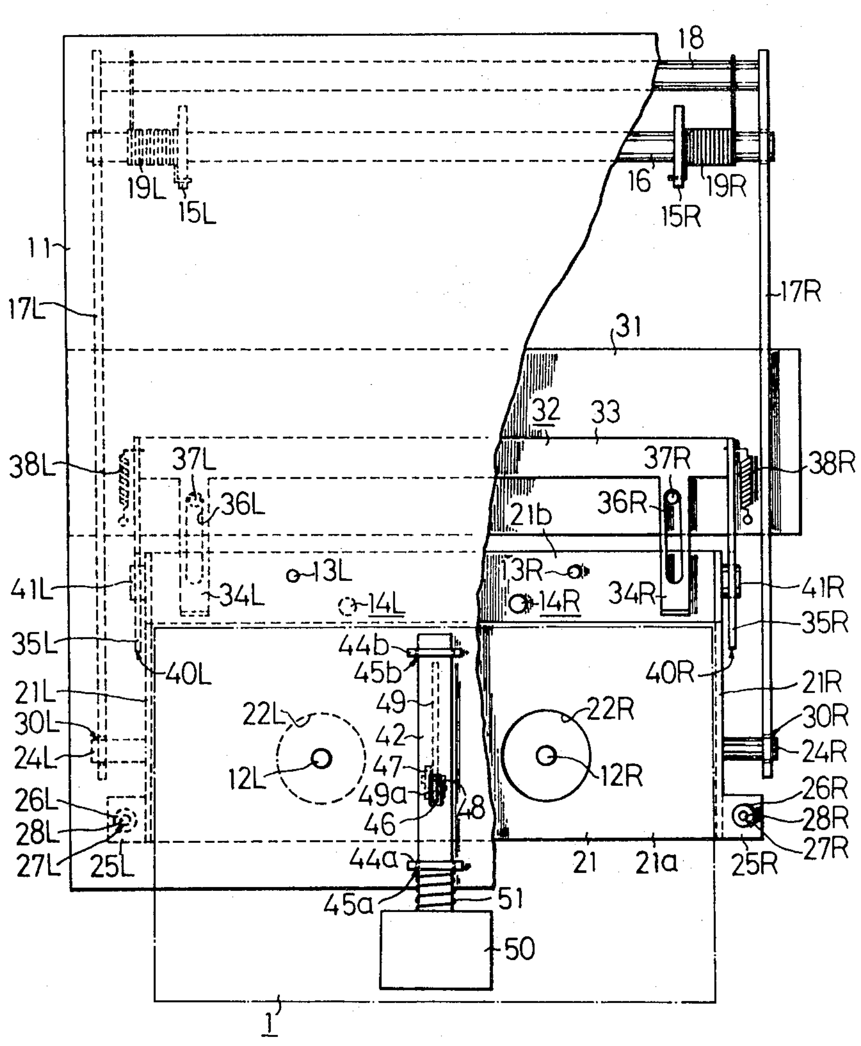
FIG. 4 is a top plan view thereof.

Description will now be made of the device according to an embodiment of this invention with reference to FIG. 3, wherein numeral 11 represents a main baseplate, and a magazine-loading portion is constituted by reel shafts 12L and 12R, capstans 13L and 13R and positioning guide members 14L and 14R.

It is a matter of course that the dimensions of the reel shafts 12L and 12R, capstans 13L and 13R, and positioning guide members 14L and 14R and positional relationships therebetween correspond to the dimensions of the reel shaft inserting apertures 5L and 5R, capstan-inserting apertures 8L and 8R and positioning through-apertures 9L and 9R of the aforementioned tape magazine 1 and positional relationships therebetween respectively. In accordance with the present invention, each of these members 14L and 14R is constituted by a columnlike portion *a* depending from the main baseplate 11 the outer diameter of which is made larger than the inner diameter of the positioning through-apertures 9L and 9R and a main body *b* integral with the portion *a* the outer diameter of which is made substantially equal to the inner diameter of the positioning through-apertures 9L and 9R at the position where it extends from the portion *a* but it is converged so that its outer diameter becomes gradually smaller toward the fore-end thereof. The lengths of extension of the guide members 14L and 14R from the main baseplate 11 are made greater than those of the reel shafts 12L and 12R and capstans 13L and 13R. Thus, the guide members 14L and 14R will have the fore-ends of the main bodies *b* thereof disposed into engagement with the positioning through-apertures 9L and 9R immediately when the magazine is brought to the magazine-loading portion from below, and thereafter the through-apertures 9L and 9R will be guided toward the columnlike portions *a* along the main bodies *b* when the magazine 1 is pushed up toward the main baseplate 11, so that the magazine 1 will be guided so as to be positively mounted in position.

Although not shown, the reel shafts 12L and 12R and capstans 13L and 13R are coupled to rotary drive means provided on the main baseplate 11.

Mounted on the main baseplate 11 at rear left- and right-hand side positions are support plates 15L and 15R depending therefrom between which a fixed shaft 16 extends, and forwardly extending rotary arms 17L and 17R are attached to the left and right end portions of the fixed shaft 16 at the rear end portion thereof for upward and downward rotation respectively. A bar 18 is provided so as to extend between positions slightly rearward relative to the positions where the rotary arms 17L and 17R are attached to the shaft 16, thereby permitting the rotary arms 17L and 17R to rotate through an equal angle with respect to the surface of the main baseplate 11. Coil springs 19L and 19R are mounted on the shaft 16 between the support plates 15L and 15R and the rotary arms 17L and 17R for example, these springs being fixed at one end to the support plates 15L and 15R for example, respectively. The other ends of the springs 19L and 19R are engaged with the upper surface of the bar 18 so that the rotary arms 17L and 17R are rotationally biased toward the loading portion of the main baseplate 11.

A holder 21 on which the magazine is adapted to rest so as to be held thereon is rotatably mounted between the fore free ends of the rotary arms 17L and 17R. The holder 21 consists of left and right sideplates 21L and 21R disposed in opposing relationship to each other with a spacing substantially equal to the horizontal width of the magazine causing 2 maintained therebetween, upper and lower sideplates **21*a* and 21*b*** disposed in opposing relationship to each other with a spacing greater than the vertical width of the magazine casing 2 maintained therebetween. Circular apertures 22L and 22R through which the reel shafts 12L and 12R are inserted are formed in the upper sideplate 21*a* at the positions corresponding to these shafts 12L and 12R of the aforementioned magazine holding portion, and notches are provided in the rear side portions of the upper sideplate 21*a* at the positions corresponding to the capstans 13L and 13R and guide members 14L and 14R of the magazine-loading portion. Further, leaf springs 23L and 23R are provided in such a manner as to extend forwardly and rearwardly along the left- and right-hand side ends of the inner surface of the lower sideplate 21*b*, so that when the aforementioned magazine 1 is placed in the holder 21, the left- and right-hand side positions thereof are governed by the left and right sideplates 21L and 21R of the holder 21 while the upper and lower positions thereof are governed by the fact that the magazine is pressed against the upper plate 21*a* of the holder 21 from below by the leaf springs 23L and 23R, as shown in FIGS. 3 to 7 by a chain line. The magazine 1 is held by the holder 21 so as to be forwardly and backwardly slidable with respect to the holder 21.

Provided in the front outer surfaces of the left and right sideplates 21L and 21R are shafts 24L and 24R projecting to the left and right respectively which are loosely inserted in apertures 30L and 30R formed in the fore free ends of the rotary arms 17L and 17R so that the holder 21 is rotatably mounted between the free ends of the rotary arms 17L and 17R.

Projections 25L and 25R are provided on the upper sideplates 21*a* of the holder 21 at forward left- and right-hand side positions thereof in such a manner as to project outwardly, and upwardly extending sleeves 26L and 26R are integrally provided on the projections 25L and 25R respectively. Apertures 27L and 27R are formed through these sleeves and projections. Guide rods 28L and 28R each having a flange *c* provided at the lower free end thereof are integrally provided on the main baseplate in correspondence to the projections 25L and 25R respectively in such a manner as to extend downwardly from the main baseplate 11. These guide rods 28L and 28R are loosely inserted through the apertures 27L and 27R respectively. In such a state, when the rotary arms 17L and 17R are rotated toward the main baseplate 11 from the lower rotational position, the holder 21 is guided by the guide rods 28L and 28R and raised until the sleeves 26L and 26R are brought into contact with the main baseplate 11. Thus, the holder 21 is held at the raised position by means of the springs 19L and 19R loaded on the rotary arms 17L and 17R respectively. On the other hand, when pushed downwardly from the aforementioned raised position, the holder 21 is guided to the lower position by the guide rods 28L and 28R. Springs 29L and 29R are interposed between the flanges *c* of the main guide rods 28L and 28R and the projections 25L and 25R of the holder 21 thereby to resiliently support the holder 21 at the lower position from below.

A subbaseplate 31 is provided substantially in parallel with the main baseplate 11 rearwardly of the holder 21 (the subbaseplate 31 is made integral with the main baseplate 11 although not shown), and an operating lever 32 is provided on the subbaseplate 31. The operating lever 32 consists of a transversely extending platelike portion 33 disposed behind the holder 21, left- and right-hand side lever portions 34L and 34R extending forwardly from the left and right portions of the platelike portion 33 and upwardly bent at their free ends and disposed in opposing relationship to the rear face of the magazine 1 which is held in the holder 21, and locking lever portions 35L and 35R extending upwardly from the left and right ends of the platelike portion 33 and further extending forwardly from the ends of the upward extensions thereof into opposing relationship to the outer faces of the left and right sideplates 21L and 21R of the holder 21 respectively. The left and right lever portions 34L and 34R are formed with longitudinally extending slots 36L and 36R through which are loosely inserted pins 37L and 37R provided on the subbaseplate 31. Springs 38L and 38R fixed at one end to the subbaseplate 31 are secured to the lever portions 35L and 35R of the lever 32 respectively. The lever 32 is forwardly slidable biased by the springs 38L and 38R so that the lever portions 34L and 34R are disposed in contact with the rear end surface of the magazine casing 2 held in the holder 21. Thus, when the magazine 1 is pushed into the holder 21, then the lever 32 will be slid rearwardly, and if the pushing-in of the magazine is stopped on the way, then the lever 32 will be made to slide forwardly so as to permit the magazine 1 to be forwardly pushed out of the holder 21. Under the condition that the magazine 1 is pushed forwardly, the slots 36L and 36R are engaged at the rear end surfaces thereof with the pins 37L and 37R respectively so that the lever 32 is held in position.

Formed in the lower ends of the locking lever portions 35L and 35R of the operating lever 32 are horizontal engaging surfaces 39L and 39R extending in a horizontal plane rearwardly from the fore free ends of the locking lever portions, and vertical engaging surfaces 40L and 40R extending upwardly from the fore-ends of the engaging surfaces 39L and 39R. Pins or rollers 41L and 41R are provided on the left and right sideplates 21L and 21R of the holder 21 at rear positions. In the case where the operating lever 32 assumes the forwardly slid position as described above, then the pins or rollers 41L and 41R of the holder 21 are disposed in engagement with the surfaces 39L and 39R of the operating lever 32 so that the holder 21 cannot be raised by the rotary arms 17L and 17R which have been rotationally biased upwardly. Thus, the holder 21 is locked at the lower position. In such a state, if the operating lever 32 is slid backwardly, the holder 21 will be still locked at the lower position insofar as the surfaces 39L and 39R of the operating lever 32 are disposed in sliding contact with the pins or rollers 41L and 41R respectively, but if the operating lever 32 is slid as far as the surfaces 39L and 39R thereof are disposed out of the pins or rollers 41L and 41R, then the holder 21 will be unlocked so that the rotary arms 17L and 17R will be rotated by the springs 19L and 19R respectively, thus resulting in the holder 21 being raised toward the main baseplate 11. Under the condition where the holder 21 is raised, the pins or rollers 41L and 41R of the holder 21 support the surfaces 40L and 40R of the lever 32 which has been slidably biased forwardly. The lever portions 34L and 34R of the lever 32 will be spaced apart from the rear end surface of the magazine casing 2, irrespective of the fact that the magazine 1 is held in the holder 21.

A return lever 42 extending transversely of the main baseplate 11 is provided substantially at the front center of the main baseplate, and it is loosely inserted through apertures 45*a* and 45*b* of upward projections 44*a* and 44*b* provided on the main baseplate 11 so as to be forwardly and backwardly slidable. A slot 46 is formed in the return lever 42, and a support plate 47 depending from the main baseplate 11 is provided at the position corresponding to the return lever 42. A transverse shaft 48 is provided on the support plate 47, and an L-shaped interlocking lever 49 is attached thereto. One end 49*a* of the interlocking lever 49 is loosely inserted through the slot 46 in such a manner as to project out of the main baseplate 11 upwardly, and the other end portion 49*b* thereof extends along the top surface of the holder 21. Provided on the fore-end of the operating lever 42 is a button 50 projecting out of the front, which serves as a thumb for making it possible to effect manipulation from outside. A spring 51 is interposed between the button 50 and the projection 44*a*. Thus, in the case where the holder assumes the raised position as described above, depression of the button 50 will cause the return lever 42 to be backwardly slid so that the interlocking lever 49 will be rotated downwardly so as to have its lower free end 49*b* brought into engagement with the top surface of the holder 21 so that the holder 21 will be depressed thereby. In such a state, if the depression of the button 50 is eliminated, then the return lever 42 and hence the locking lever 49 will be returned to the original position by means of spring 51.

Figure 5:
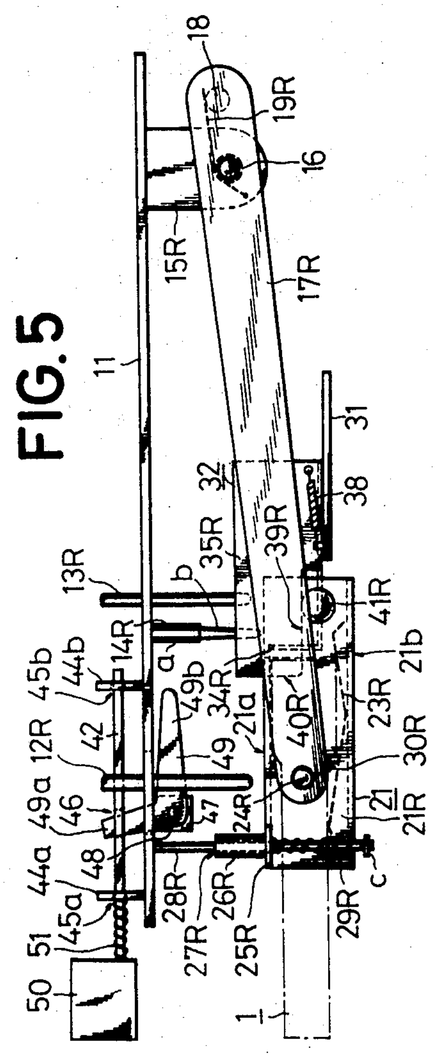
FIG. 5 is a side view thereof.

The arrangement of the tape magazine-loading device embodying the present invention has been described above. Now, the operation of the device described so far will be explained. Referring to FIG. 5, the magazine 1 is shown as being able to be pushed into or removable from the holder 21. The magazine case 2 indicated by chain lines is held in the holder 21 with its rear face located adjacent to the lever portions 34L and 34R of the operating lever 32. Thus, the operating lever 32 assumes the forwardly slid position, and at this point, the rotary arms 17L and 17R which have been rotationally biased upwardly as described above will tend to raise the holder 21; however, the holder 21 will remain locked at the lower position because of the fact that the pins or rollers 41L and 41R of the holder 21 are disposed in engagement with the surfaces 39L and 39R of the lever 32.

Figure 6:
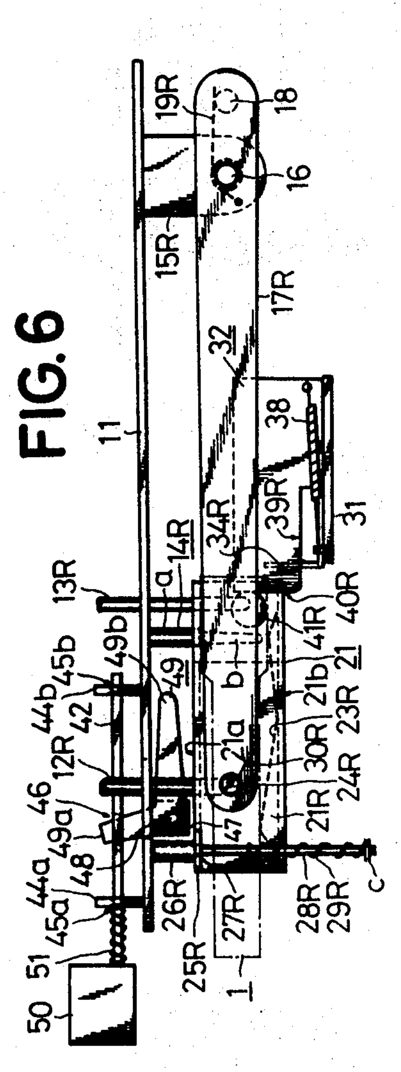
FIGS. 6 and 7 are views useful for explaining the operation of said tape magazine-loading device.

Under such a condition, by pushing the magazine 1 into the holder 21, the operating lever 32 will be slid backwardly against the springs 38L and 38R as shown in FIG. 6, so that the holder 21 will be unlocked when the magazine 1 is pushed in as far as such a position that the surfaces 39L and 39R of the lever 32 are prevented from contacting the pins or rollers 41L and 41R of the holder 21. Thus, the rotary arms 17L and 17R will be rotated upwardly by the springs 19L and 19R so that the holder 21 will be raised at the main baseplate 11 side while being guided by the guide rods 28L and 28R. Thereafter, the holder 21 will be maintained at the raised position by the rotary arms 17L and 17R which have been rotationally biased.

Because of the fact that the extending lengths of the guide member 14L and 14R of the loading portion are made greater than those of the other elements and these guide members are longitudinally tapered, the magazine 1 which is held in the holder 21 until the latter is made to assume the raised position will be positioned forwardly and backwardly relative to the magazine-loading portion mainly by the guide members 14L and 14R so that the capstans 13L, 13R and reel shafts 12L, 12R will be surely inserted through the capstan-inserting apertures 8L, 8R and reel shaft inserting apertures 5L, 5R of the magazine 1. In this way, when the holder 21 is held at the raised position, the magazine 1 will be brought into contact with the columns *a* of the guide members 14L and 14R so as to be accurately loaded in the magazine-loading portion in position.

Thus, the magazine 1 which is loaded in the loading portion while being carried by the holder 21 as shown in FIG. 6 is positioned on the guide members 14L and 14R to be held thereat while being pressed against the columnlike bodies *a* of the guide members 14L and 14R. The holder 21 is pressed against and held by the main baseplate 11 through the guide sleeves 26L and 26R by the rotary arms 17L and 17R which have been rotationally biased, and it is also pressed against and held relative to the shaft apertures 25L and 25R of the rotary arms 17L and 17R through the shafts 24L and 24R by the fact that the pins or rollers 41L and 41R of the holder 21 are disposed in engagement with the surfaces 40L and 40R of the operating lever 32. Hence, even if shock, vibration or the like is externally applied, the magazine can still be stably maintained in the loaded state with respect to the loading portion.

With the magazine 1 loaded in the aforementioned manner, the magnetic tape 4 will be transported while being held between the capstan 13L or 13R and the pinch roller by bringing the pinch roller provided below the main baseplate 1 into rotating contact with the capstans 13L or 13R, although not shown, so that signals can be recorded on or reproduced from the magnetic tape by means of the magnetic head provided below the main plate 11 by rotating the reel shafts 12L and 12R in the direction corresponding to the direction of the tape transportation with a magnetic head provided below the baseplate 11 being disposed in contact with the magnetic tape 4.

Figure 7:
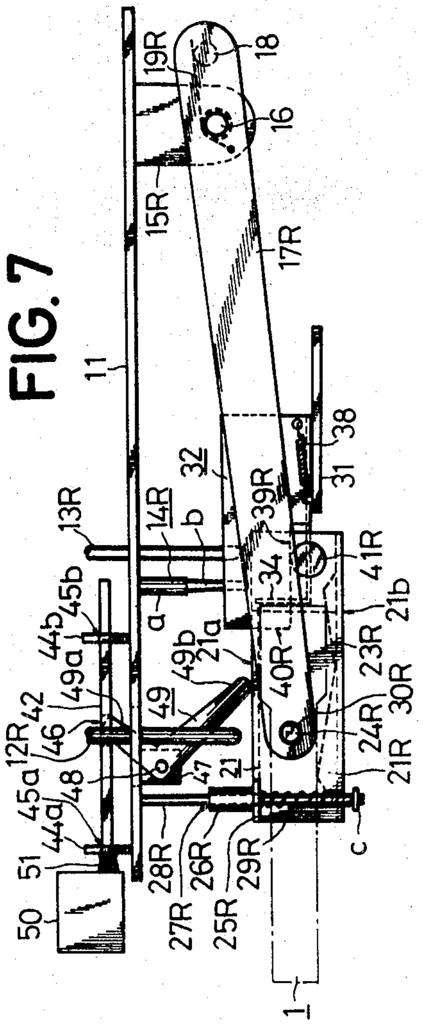

In such a state, depression of the button 50 will cause the interlocking lever 49 to be rotated downwardly so that the holder 21 will be depressed against the springs 19L and 19R of the rotary arms 17L and 17R, as shown in FIG. 7. Thus, the pins or rollers 41L and 41R of the holder 21 will be slid down the surfaces 40L and 40R of the operating lever 32, and when these pins or rollers are prevented from further effecting such sliding movement, the operating lever 32 will be returned to the forward position as shown in FIG. 5 so as to push the magazine forwardly relative to the holder 21. As a result, the magazine will assume such a projected position as shown in FIG. 5. At this point, by eliminating the depression of the button 50, the interlocking lever 49 will be returned to such a position as shown in FIG. 5 so that the rotary arms 17L and 17R will be rotated with the aid of the springs 19L and 19R and the pins or rollers 41L and 41R of the holder 21 will be brought into contact with the surfaces 39L and 39R of the lever 32. In this way, the holder 21 will be locked in the lower position by the operating lever 32, and thus the device will be returned to such a condition as shown in FIG. 5.

As described above, in accordance with the present invention, there is provided a simplified tape magazine-loading device wherein the tape magazine can be automatically loaded in position merely by being pushed into the holder, wherein removal of the tape magazine can also be automatically achieved merely by depressing the button, and wherein the tape magazine can be surely positioned in place when it is to be loaded. Furthermore, the tape magazine carried into the holder is pressed against and held by the guide rollers of the loading portion while being loaded in the magazine-loading portion, and since the holder is pressed against and carried by the baseplate and rotary arms, the loaded condition of the tape magazine with respect to the loading portion can be stably maintained even if shock, vibration, or the like is externally applied.

Although, in the foregoing, description has been made of the case where the holder 21 is provided with the pins or rollers 41L and 41R with which the surfaces 39L, 39R or 40L, 40R of the operating lever 32 are associated, it is also possible that similar pins or rollers may be provided on the rotary arms 17L and 17R, instead of the pin or rollers 41L and 41R provided on the holder 21 so as to be similarly associated with the surfaces 39L, 39R or 40L, 40R of the operating lever 32. At any rate, the design may be made such that the operating lever is associated with the holder or rotary arms so that the holder may be locked in the lower position, and when brought to the lower position, the holder is locked thereat so that the tape magazine may be pushed forwardly of the holder.

Furthermore, although, in the foregoing, description has been made of the case where tape-loading release means is constituted by the use of the button 50, return lever 42, and interlocking lever 49, it will be apparent that the design may be made such that such release means includes a thumb which can be externally manipulated and the holder assuming the raised position can be depressed down to the aforementioned locked position by depressing the thumb.

In the foregoing, the tape magazine-loading device was constituted with respect to the horizontally extending main baseplate; however, it is equally possible to use a main baseplate which is arranged so as to extend in any desired direction, as will be readily apparent to those skilled in the art.

I claim:

1. A tape magazine-loading device comprising:

a. a baseplate provided on one surface thereof with a loading portion for a tape magazine containing magnetic tape therein;

b. left and right rotary arms extending forwardly over said one surface of said baseplate and rotatably mounted on said baseplate, first spring means biasing said left and right rotary arms toward said one surface of said baseplate;

c. a holder for said tape magazine that is rotatably mounted between the free ends of said left and right rotary arms;

d. means for supporting said holder in such a manner as to maintain said holder in substantially parallel opposing relationship to said loading portion of said baseplate; and, e. an operating lever for locking said holder at a predetermined position spaced apart from said loading portion against the biasing force of said spring means, said operating lever being slidably mounted on a subbaseplate integral with said baseplate so as to slide forwardly and backwardly and second spring means biasing the subbaseplate in the extending direction of the surface of said baseplate toward the free ends of said left and right rotary arms, wherein by pushing said tape magazine into said holder against the biasing force of said second spring means while said holder assumes said predetermined position, said holder is released from the locked state at said predetermined position so that said tape magazine can thereafter be automatically loaded in said loading portion of said baseplate.

2. A tape magazine-loading device according to claim 1, further including means for releasing said tape magazine from the loaded condition, said means being associated with said holder in such a manner as to bring said holder to said predetermined position spaced apart from said loading portion against the biasing force of said first spring means, wherein when brought to said predetermined position by said releasing means, the tape magazine held in said holder is pushed out forwardly by forward sliding movement of said operating lever due to said second spring means and said holder is locked at said predetermined position.

3. A tape magazine-loading device comprising:

a. a baseplate provided on one surface thereof with a loading portion for a tape magazine containing a magnetic tape therein;

b. left and right rotary arms extending forwardly over said one surface of said baseplate and rotatably mounted on said baseplate in such a manner as to move toward and away from said one surface of said baseplate;

c. spring means biasing said rotary arms toward said one surface of said baseplate;

d. a holder for said tape magazine that is rotatably mounted between the forwardly extending free ends of said left and right rotary arms;

e. means for supporting said holder in such a manner as to maintain said holder in substantially parallel opposing relationship to said loading portion of said baseplate;

f. an operating lever for locking said holder at a predetermined position spaced apart from said loading portion; and, g. tape magazine-releasing means for bringing said holder to said predetermined position against the biasing force of said spring means, wherein said loading portion of said baseplate includes capstans, reel shafts, and positioning guide members all of which extend toward said holder, wherein said holder comprises left and right sideplates disposed in parallel opposing relationship to each other, a top plate formed with apertures through which said capstans, said reel shafts and said positioning guide members are inserted, and a bottom plate disposed in parallel composing relationship to said top plate, said left and right sideplates being provided with outwardly projecting pins or rollers, said holder being provided with leaf springs for biasing said tape magazine toward said top plate when said tape magazine is inserted in said holder, wherein said operating lever comprises a platelike portion extending transversely behind said holder and forwardly and backwardly slidable, left- and right-hand side lever portions extending forwardly from the left- and right-hand side portions of said platelike portion so as to be inserted in said holder, and left and right locking lever portions extending from the left- and right- hand side portions of said platelike portion in opposing relationship to the outer surface of the left and right sideplates of said holder, said left and right locking lever portions being provided with horizontal engaging surfaces adapted for engagement with the outer peripheries of the pins or rollers of said holder and vertical engaging surfaces extending toward said baseplate from the fore-ends of said horizontal engaging surfaces and adapted for engagement with the outer peripheries of the pins or rollers of said holder, said holder being adapted to be locked at said predetermined position while the pins or rollers of said holder are disposed in engagement with said horizontal engaging surfaces, at this point said operating lever being slid backwardly so that when the engagement between the pins or rollers of said holder and said horizontal engaging surfaces is eliminated, said holder is moved toward said loading portion by the bias force of said spring means while said pins or rollers are being engaged with said vertical engaging surfaces, and wherein said tape magazine-releasing means includes a return lever provided with said baseplate and an interlocking lever having a portion extending toward said holder, said holder being pressed through said interlocking lever by actuation of said return lever while the same is being loaded in said loading portion, whereby the pins or rollers of said holder are engaged with the horizontal engaging surfaces of said operating lever so that said holder is locked at said predetermined position and the tape magazine in said holder is pushed out forwardly by forward sliding movement of said operating lever.

4. A tape magazine-loading device according to claim 1, said operating lever slidably mounted to a subbaseplate integral with said baseplate so as to slide forwardly and backwardly and biased by operating lever spring means in the extending direction of the surface of said baseplate toward the free ends of said left and right rotary arms, whereby when brought to said predetermined position of said tape magazine-releasing means the tape magazine held in said holder is pushed out forwardly by forward sliding movement of said operating lever due to said operating spring means.

* * * * *